(12) United States Patent
Gale et al.

(10) Patent No.: US 6,779,128 B1
(45) Date of Patent: Aug. 17, 2004

(54) FAULT-TOLERANT DATA TRANSFER

(75) Inventors: Alan Gale, Carver, MA (US);
Christain Bourdin, Natick, MA (US);
Gene Cummings, Sherbon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/507,326

(22) Filed: Feb. 18, 2000

(51) Int. Cl.[7] .......................... G06F 11/00; G11C 29/00
(52) U.S. Cl. .................. 714/6; 714/7; 714/8; 714/42; 714/43; 714/718; 714/44
(58) Field of Search ............................. 714/42, 43, 52, 714/718, 719, 6, 7, 8

(56) References Cited

U.S. PATENT DOCUMENTS

| | | |
|---|---|---|
| 3,810,119 A | 5/1974 | Zieve et al. |
| 3,825,905 A | 7/1974 | Allen, Jr. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,410,942 A | 10/1983 | Milligan et al. |
| 4,423,486 A | 12/1983 | Berner |
| 4,428,044 A | 1/1984 | Liron |
| 4,435,762 A | 3/1984 | Milligan et al. |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,609,995 A | 9/1986 | Hasebe |
| 4,615,001 A | 9/1986 | Hudgins, Jr. |
| 4,628,437 A | 12/1986 | Poschmann et al. |
| 4,641,276 A | 2/1987 | Dunki-Jacobs |
| 4,648,064 A | 3/1987 | Morley |
| 4,649,479 A | 3/1987 | Advani et al. |
| 4,654,819 A * | 3/1987 | Stiffler et al. ............... 711/162 |
| 4,663,704 A | 5/1987 | Jones et al. |

(List continued on next page.)

OTHER PUBLICATIONS

Stevens, et al. "TCP/IP Illustrated, vol. 1. The Protocols," *TCP/IP Illustrated* vol. 1, XP–002106390, pp. 85–96.
*ICCard Design* Sep./Oct. 1995.
Strack, Bob. "The Hawk is Soaring," *Chemical Processing* (May 1996) p. 11.
"Control System Features Plug–and–Play Technology, Scalability," *Chemical Processing* (May 1996), p. 33.
"Editors' Product Picks," *Chemical Processing* (May 1996), p. 34.
"Agenda," ISA/SP50—1988–180, ISA Draft.
Application of PRIAM Model to Safety Systems on Offshore Oil/Gas Platforms. Silvertech Ltd., Jan. 9, 1995.

(List continued on next page.)

*Primary Examiner*—Robert Beausoliel
*Assistant Examiner*—Emerson Puente
(74) *Attorney, Agent, or Firm*—David J. Powsner; Nutter, McClennen & Fish

(57) ABSTRACT

A control system has a first module that includes a memory and diagnostic logic. The diagnostic logic periodically tests at least selected locations in the memory and, in connection with such testing, reads data from those locations and writes that data back to the locations. A second module is coupled to the first module such that the written back data is transferred to the second module, as well as to the memory of the first. Mapping or other conversion logic can translate addresses or other data identifiers, as necessary, to insure that the transferred data is properly identified upon its receipt by the second module.

29 Claims, 3 Drawing Sheets

U.S. PATENT DOCUMENTS

| | | |
|---|---|---|
| 4,672,530 A | 6/1987 | Schuss |
| 4,675,812 A | 6/1987 | Capowski et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,742,349 A | 5/1988 | Miesterfeld et al. |
| 4,750,109 A | 6/1988 | Kita |
| 4,790,762 A | 12/1988 | Harms et al. |
| 4,805,107 A | 2/1989 | Kieckhafer et al. |
| 4,816,996 A | 3/1989 | Hill et al. |
| 4,817,094 A | 3/1989 | Lebizay et al. |
| 4,872,106 A | 10/1989 | Slater |
| 4,910,658 A | 3/1990 | Dudash et al. |
| 4,910,691 A | 3/1990 | Skeirik |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,129,087 A | 7/1992 | Will |
| 5,134,574 A | 7/1992 | Beaverstock et al. |
| 5,136,704 A | 8/1992 | Danielsen et al. |
| 5,138,708 A | 8/1992 | Vosbury |
| 5,146,589 A | 9/1992 | Peet, Jr. et al. |
| 5,151,981 A | 9/1992 | Westcott et al. |
| 5,162,986 A | 11/1992 | Graber et al. |
| 5,163,055 A | 11/1992 | Lee et al. |
| 5,166,685 A | 11/1992 | Campbell, Jr. et al. |
| 5,168,276 A | 12/1992 | Huston et al. |
| 5,175,829 A | 12/1992 | Stumpf et al. |
| 5,193,175 A | 3/1993 | Cutts, Jr. et al. |
| 5,212,784 A | 5/1993 | Sparks |
| 5,216,672 A * | 6/1993 | Tatosian et al. ............ 714/718 |
| 5,233,615 A | 8/1993 | Goetz |
| 5,255,367 A | 10/1993 | Bruckert et al. |
| 5,258,999 A | 11/1993 | Wernimont et al. |
| 5,271,013 A | 12/1993 | Gleeson |
| 5,274,648 A | 12/1993 | Eikill et al. ................ 371/21.2 |
| 5,283,729 A | 2/1994 | Lloyd |
| 5,289,365 A | 2/1994 | Caldwell et al. |
| 5,295,258 A | 3/1994 | Jewett et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,372 A | 4/1994 | Sawyer et al. |
| 5,317,726 A | 5/1994 | Horst |
| 5,335,221 A | 8/1994 | Snowbarger et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,381,529 A | 1/1995 | Matsushima |
| 5,390,321 A | 2/1995 | Proesel |
| 5,398,331 A | 3/1995 | Huang et al. |
| 5,400,140 A | 3/1995 | Johnston |
| 5,410,717 A | 4/1995 | Floro |
| 5,428,781 A | 6/1995 | Duault et al. |
| 5,434,997 A | 7/1995 | Laundry et al. |
| 5,444,851 A | 8/1995 | Woest |
| 5,450,403 A | 9/1995 | Ichii et al. |
| 5,450,425 A | 9/1995 | Gunn et al. |
| 5,450,764 A | 9/1995 | Johnston |
| 5,451,939 A | 9/1995 | Price |
| 5,457,797 A | 10/1995 | Butterworth et al. |
| 5,459,839 A | 10/1995 | Swarts et al. |
| 5,463,735 A | 10/1995 | Pascucci et al. |
| 5,475,856 A | 12/1995 | Kogge |
| 5,481,125 A * | 1/1996 | Harris ........................ 257/203 |
| 5,481,741 A | 1/1996 | McKaskle et al. |
| 5,483,660 A | 1/1996 | Yishay et al. |
| 5,485,620 A | 1/1996 | Sadre et al. |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,655 A | 5/1996 | Collins et al. |
| 5,519,701 A | 5/1996 | Colmant et al. |
| 5,522,044 A | 5/1996 | Pascucci et al. |
| 5,530,643 A | 6/1996 | Hodorowski |
| 5,539,909 A | 7/1996 | Tanaka et al. |
| 5,544,008 A | 8/1996 | Dimmick et al. |
| 5,550,980 A | 8/1996 | Pascucci et al. |
| 5,551,047 A | 8/1996 | Mori et al. |
| 5,555,213 A | 9/1996 | DeLong |
| 5,555,437 A | 9/1996 | Packer |
| 5,555,510 A | 9/1996 | Verseput et al. |
| 5,559,963 A | 9/1996 | Gregg et al. |
| 5,568,378 A | 10/1996 | Wojsznis |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,112 A | 12/1996 | Tabata |
| 5,586,329 A | 12/1996 | Knudsen et al. |
| 5,586,330 A | 12/1996 | Knudsen et al. |
| 5,587,899 A | 12/1996 | Ho et al. |
| 5,594,899 A | 1/1997 | Knudsen et al. |
| 5,596,752 A | 1/1997 | Knudsen et al. |
| 5,600,845 A | 2/1997 | Gilson |
| 5,604,871 A | 2/1997 | Pecone |
| 5,611,057 A | 3/1997 | Pecone et al. |
| 5,613,148 A | 3/1997 | Bezviner et al. |
| 5,617,540 A | 4/1997 | Civanlar et al. |
| 5,627,979 A | 5/1997 | Chang et al. |
| 5,629,949 A | 5/1997 | Zook |
| 5,630,056 A | 5/1997 | Horvath et al. |
| 5,630,152 A | 5/1997 | DeLuca et al. |
| 5,642,511 A | 6/1997 | Chow et al. |
| 5,649,121 A | 7/1997 | Budman et al. |
| 5,655,092 A | 8/1997 | Ojala |
| 5,659,680 A | 8/1997 | Cunningham et al. |
| 5,664,168 A | 9/1997 | Yishay et al. |
| 5,671,374 A | 9/1997 | Postman et al. |
| 5,676,141 A | 10/1997 | Hollub |
| 5,680,404 A | 10/1997 | Gray |
| 5,680,409 A | 10/1997 | Qin et al. |
| 5,682,476 A | 10/1997 | Tapperson et al. |
| 5,687,316 A | 11/1997 | Graziano et al. |
| 5,701,414 A | 12/1997 | Cheng et al. |
| 5,708,779 A | 1/1998 | Graziano et al. |
| 5,727,128 A | 3/1998 | Morrison |
| 5,748,467 A | 5/1998 | Qin et al. |
| 5,751,574 A | 5/1998 | Loebig |
| 5,752,007 A | 5/1998 | Morrison |
| 5,752,008 A | 5/1998 | Bowling |
| 5,758,073 A | 5/1998 | Liang et al. |
| 5,758,075 A | 5/1998 | Graziano et al. |
| 5,761,518 A | 6/1998 | Boehling et al. |

| | | | |
|---|---|---|---|
| 5,768,119 A | | 6/1998 | Havekost et al. |
| 5,777,874 A | | 7/1998 | Flood et al. |
| 5,790,791 A | | 8/1998 | Chong et al. |
| 5,793,963 A | | 8/1998 | Tapperson et al. |
| 5,794,071 A | | 8/1998 | Watanabe et al. ........... 395/847 |
| 5,796,602 A | | 8/1998 | Wellan et al. |
| 5,797,038 A | | 8/1998 | Crawford et al. |
| 5,801,942 A | | 9/1998 | Nixon et al. |
| 5,805,922 A | | 9/1998 | Sim et al. |
| 5,822,220 A | | 10/1998 | Baines |
| 5,828,851 A | | 10/1998 | Nixon et al. |
| 5,835,704 A | | 11/1998 | Li et al. ................ 395/183.18 |
| 5,841,963 A | | 11/1998 | Nakamikawa et al. |
| 5,854,944 A | | 12/1998 | Catherwood et al. |
| 5,862,052 A | | 1/1999 | Nixon et al. |
| 5,872,992 A | | 2/1999 | Tietjen et al. |
| 5,873,089 A | | 2/1999 | Regache |
| 5,909,586 A | | 6/1999 | Anderson |
| 5,974,497 A | | 10/1999 | Teshome .................... 710/129 |
| 6,018,778 A | | 1/2000 | Stolowitz ...................... 710/61 |
| 6,119,244 A | * | 9/2000 | Schoenthal et al. ............ 714/4 |
| 6,173,377 B1 | * | 1/2001 | Yanai et al. ................ 711/162 |
| 6,240,526 B1 | * | 5/2001 | Petivan et al. ................ 714/11 |
| 6,263,452 B1 | * | 7/2001 | Jewett et al. ................... 714/9 |
| 6,389,564 B1 | * | 5/2002 | Lu ............................. 714/718 |
| 6,484,271 B1 | * | 11/2002 | Gray ............................. 714/6 |
| 6,487,561 B1 | * | 11/2002 | Ofek et al. ................. 707/204 |

U.S. PATENT DOCUMENTS

"Automation System Monitors, Controls Fab HVAC, Other Systems," *Microcontamination* (Aug. 1994).

Batch Control. Part I: Models and Terminology. (Approved Feb. 28, 1995) ISA–S88.01 1995.

Benkhallat, Yazid, et al. "Interoperability of sensors and distributed systems," *Sensors and Actuators* A vol. 37–38 (1993), 247–254.

Blevins, Terry. "Characteristics of Function Block Requirements for the Process Industry and Manufacturing Automation," Fisher–Rosemount, Oct. 31, 1995.

Brunn, P. "Collision Avoidance for Two Robots Sharing a Common Workspace," (1995) The Institution of Electrical Engineers.

Burton, P. I. "A personal history of batch control," *Measurement + Control* vol. 27 (Apr. 1994), pp. 69–73.

Burton, P. I., et al. "Field Bus Based on MIL–STD–1553B: Proposal to ISA–SP–50" ERA Technology Ltd. (Apr. 6, 1988) ISA/SP50–1988–148.

Capetta, L., et al. "From Current Actuators and Transmitters Towards Intelligent Actuation and Measurement: PRIAM Approach," BIAS 93.

Caro, Richard H. "Field Bus Applications," ISA (1989) Paper #89–0569, pp. 989–994.

Caro, Richard H. "The Fifth Generation Process Control Architecture," ISA (1988) Paper #88–1487, pp. 659–667.

Caro, Richard H. "The Fifth Generation Process Control Architecture," *ISA Transactions* vol. 28 No. 4 (1989), pp. 23–28.

Chettle, Tim. "Multiplexing techniques optimise data collection," *Electrotechnology* (Oct./Nov. 1995).

Coleman, Vernon. "National Electrical Manufactures Assoication Field Bus Report to ISA SP50," (Oct. 1988) ISA/SP50–1988–234.

Conference Record of the 1993 IEEE Industry Applications Conference, Part III (excerpt).

Contents, Proceedings of the Second International Workshop on Configurable Distrubuted Systems, Mar. 21–23, 1994, Pittsburgh, PA.

Craig, Lynn W. "SP–88 Defines Batch Control," *INTECH* Mar. 1994, pp. 34–37.

Crowder, R. S. "A Communication Architecture for Automation & Control," ISA, pp. 669–673.

Crowder, R. S.. "Generic Data Link Transactions for Simple Devices," Proposal to ISA SP 50 & IEC/SC65C/WG6 (Oct. 15, 1988) ISA Document.

Delahostria. Communication Model Application Layer. (Oct. 14, 1988) ISA/SP50–1988 247, ISA Draft.

Delfino, B. and Pinceti, P. "Fieldbus Applications for Electrical Industrial Systems," *IEEE* (1993), pp. 2084–2090.

Dezso, Danyi. "Halozati szabalyozas," *Meres es Automatika* vol. 37 (1989), pp. 208–213.

Editing Committee Draft Application Layer, Version 6, Dec. 1990.

Editing Committee Draft Application Layer, Version 8, May 1991.

Editing Committee Draft Application Layer, Version 12, Oct. 1991.

Esprit Project 6188, "PRIAM Dictionary: Major Terms and Definitions Used in the PRIAM Project," Prenormative Requirements for Intelligent Actuation and Measurement, May 1995.

Esprit Project 8244, "User Requirements for Intelligent Transmitter and Actuators," European Intelligent Actuation and Measurement User Group, Nov. 24, 1995.

Fieldbus Standard for Use in Industrial Control Systems. Part 2: Physical Layer Specification and Service Definition. (1992) ANSI/ISA/S50.02.

Foxboro Fieldbus Proposal (Presented to ISA SP–50 Committee Feb. 24, 1988) ISA/SP50–1988–123B, ISA Draft.

Furness, Harry. "Fieldbus: The Differences Start From the Bottom Up," *Control Engineering* (Mar. 1994), pp. 75–77.

Holding, David and Wood, Graham. "Communications in microprocessor industrial implementation," *Microprocessors and Microsystems* vol. 3 No. 10 (Dec. 1979), pp. 443–451.

Johnson, Dick. "Prepare Sensing Advances: Are They in our Process'Future?" *Control Engineering* (Apr. 1995), pp. 67–72.

Kelly, D. Mark. "Digital fieldbus cluster cuts plant's wiring costs up to 20%," *INTECH* (Apr. 1995), pp. 62–64.

Koth, H. and Oeder, K. "The Advantages of Intelligent Field Modules for Nuclear Power Plant Operation and Maintenance," Kerntechnik 60 (1996) 5–6, pp. 215–219.

Lenhart, Gerald W. "A Field Bus Approach to Local Control Networks," ISA, Paper #93–281 (1993).

Lenhart, Gerald W. "Fieldbus–Based Local Control Networks," *INTECH* (Aug. 1994), p. 31–34.

Loose, Graham. "Fieldbus—the user's perspective," *Measurement + Control* vol. 27 (Mar. 1994), pp. 47–51.

Meeting Minutes, SP50, International Electrotechnical Commission, Technical Committee No. 65: Industiral–Process Measurement and Control, Sub–Committee 65C: Digital Data Communications for Measurement and Control and Working Group 6: Field Bus Standard for Use in Industrial Control Systems, Feb. 28–Mar. 4, 1988, Scottsdale, AZ.

Meeting Minutes, SP50.4 Application Layer, Oct. 19–21, 1988, Houston, TX.

Meeting Minutes, Windows Working Group of Application Subcommittee, Mar. 1–3, 1989, New Orleans, LA.

Meeting Minutes Ad Hoc Function Block Meeting, Jun. 14, 1990, Chapel Hill, NC.

Meeting Minutes, SP50, Signal Compatibility of Electrical Instruments, Dec. 5–7, 1990, Orlando, FL.

Meeting Minutes, Process Control Working Group of SP50.4, Jan. 21–23, 1991, Atlanta, GA.

Meeting Notes, International Electrotechnical Commission Sub Committee No. 65C: Digital Communications Working Group 7, Process Control Function Blocks Report to AMT/ 7. Apr. 4, 1996.

Mirabella, Orazio. "A Short Presentation of IEC Fieldbus Application Layer," Informatics and Communication Institute, Engineering Faculty, University of Catania, Italy.

Morel, G., et al. "Discrete Event Automation Engineering: Outline of the PRIAM Project".

"NCR Fieldbus Slave Controller Advance Information," ISA–SP50–1988–161, ISA Draft.

NOAH: Network Oriented Application Harmonisation based on General Purpose Field Communication System. Project description rev. 1.0, Oct. 25, 1995. P–NET, PROFI-BUS, WorldFIP.

Nobuhiko, Tsuji, et al. "An Advanced Optical Fieldbus Instrumentation System Using 16 x 16 Reflection Type Optical Star Coupler and Low Powered Transmitter," pp. 755–764.

Output to Valve, Revision No. 1.4, Jan. 18, 1991, (Draft Document), Instrument Society of America.

Owen, S., et al. "A modular reconfigurable approach to the reation of flexible manufacturing cells for education purposes," *Fast Reconfiguraciton of Robotic and Automation Resources* (Colloquium) Oct. 20, 1995, The Institution of Electrical Engineers, Digest No. 95/174.

Pace, Hugh W. "Valve Actuators Ready for Fieldbus," *Control Engineer* (Oct. 1995), pp. 65–73.

Petti, Thomas F. and Dhurjati, Prasad S. "A Coupled Knowledge Based System Using Fuzzy Optimization for Advisory Control," *IChE Journal* vol. 38 (Sep. 1992) No. 9, pp. 1369–1378.

Pfeifer T. and Fussel B. "Sensorbetribssystem fur messtechnische Problemstellungen in der Produktionstechnik," *Technisches Messen* vol. 58 (1991) Nos. 7/8.

Phinnery, Thomas L. "An Analysis of Contending Proposals in ISA SP–50 for an ISA/IEC Field Instrument Bus," ISA (1988) Paper #88–1489.

Preface: Field Bus Process Control User Layer Technical Support, Feb. 10, 1993.

Product Specification, I/A Series ® RBATCH II.

Proway–LAN Industrial Data Highway. (Approved Feb. 3, 1986) ISA–S72.01–1985.

Report from IEC TC65 Working Group 6 Function Blocks, May 1, 1995.

Schuur, C. "Comments on 'Analysis and Suggestions for ISA–SP50' as submitted to the SP50 Committee by Honeywell Inc." (Mar. 11, 1988) ISA–SP50–1988–155, ISA Draft.

Schuur, Chris and Warrior, Jay. "Philips Token Passing Field Bus Controller Timed Token Mode," ISA/SP50—1988–186, ISA Draft.

"SDRD Using 1553B Data Link Services," ISA/ SP50–1988–243 (1988).

Skabowski, E. L. "Recommendations for Consideration at October, 1988 Application Layer Subcommittee Meeting," (Oct. 3, 1986).

Solvie, Michael J. "Configuration of Distributed Time–Critical Fieldbus Systems," *IEEE* (1994), p. 211.

Strothman, Jim and Ham, John. "Alliances, Fieldbus, Windows Stir ISA/94 Anaheim Pot," *INTECH* (Dec. 1994), pp. 32–35.

Strothman, Jim and Ham, John. "ISA/95 New Orleans: 'Open', NT winds (not Opal) blow strong," *INTECH* (Nov. 1995), pp. 45–48.

"Suggested Outline for Application Sub–committee Document: Fieldbus Architecture Subcommittee Document," ISA/SP50–1988–175, ISA Draft.

Table of Contents, Automation & Technology Department, 1995.

Table of Contents, Automation & Technology Department, 1993.

Table of Contents, Industrial Computing Society (no date).

Table of Contents, Proceedings of the Industrial Computing Conference, vol. 3, Sep. 19–24, 1993, Chicago, IL. Industrial Computing Society.

[Table of Contents], Proceedings of the 20th International Conference on Industrial Electronics Control and Instrumentation, vols. 1–3, Sep. 5–9, 1994, Bologna, Italy.

[Table of Contents], Proceedings of the 7th Mediterranean Electrotechnical Conference, vol. 1, Apr. 12–14, 1994, Antalya, Turkey.

Table of Contents, ISA/88, Houston, MA, (no date).

Table of Contents, ISA/89, (no date).

Tobin, David. "Southeast Paper Installs Largest Foxboro Distributed Control System."

"User Layer Structure," SP–50 Technical Report (Jul. 25, 1990).

"User Layer Technical Report," ISA/SP50—1990–389C, ISA Draft.

Weinert, A., et al. "RT/OS—a realtime programming and application environment for the COSY control system," *Nuclear Instruments and Methods in Physics Research A* vol. 352 (1994), pp. 277–279.

WG1 List of Criteria (Appendix 1), (Oct. 21, 1988) ISA/ SP50–1988–242, ISA Draft.

Wood, G. G. "The Argus CONSUL System for On–Line Computer Control," *Electrical Engineering Transactions* (Mar. 1969), pp. 114–118.

Wood, G. G. "The Challenge of Standards for Plant Communication," IFAC Distributed Computer Control Systems, (1982), pp. 191–192.

Wood, G. G. "Current Fieldbus activities," *computer communications* vol. 11 (Jun. 1988) No. 3, pp. 118–123.

Wood, Graeme G. "Data Transmission, Processing and Presentation," pp. 46–54.

Wood, G. G. "Evolution of communication standards for the process industry," *Measurement + Control* vol. 19 (Jul./Aug. 1986), pp. 183–188.

Wood, Graeme. "Fieldbus Status 1995," *Computing & Control Engineering Journal* (Dec. 1995), pp. 251–253.

Wood, Graeme. "Generic Link Transactions for Simple Devices in Fieldbus." ISA/SP50—1988—240 (Sep. 20, 1988).

Wood, Graeme, G. "Standardisation Work for Communication Among Distributed Industrial Computer Control Systems—A Status Report," INRIA (1984), pp. 67–69.

Wood, G. G. "Survey of LANs and Standards," *Computer Standards & Interfaces* vol. 6, (1987), pp. 27–36.

Wood, G. G. "Towards digital information control," *Measurement + Control* vol. 21 (Jul./Aug. 1988), pp. 179–180.

* cited by examiner

FAULT-TOLERANT DATA TRANSFER

BACKGROUND OF THE INVENTION

The invention pertains to process control and, more particularly, to digital data processing methods and apparatus for duplicating data in control systems.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor the device or system in question and automatically adjust its operational parameters. In other control systems, such apparatus monitor the device or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in electric and other service industries. Environmental control finds application in residential, commercial, institutional and industrial settings, where temperature and other environmental factors must be properly maintained. Control is also used in articles of manufacture, from toasters to aircraft, to monitor and control device operation.

Reliability is among the key requirements of any control system. Failures are almost never acceptable, for example, in critical process control and safety applications. Even occasional failures are undesirable in conventional control applications, such as manufacturing process control.

The art suggests the use of testing and other operational techniques to improve the reliability of control systems. Industry standards, such as IEC 61508 and DIN V VDE 0801, Class AK6, for example, set minimum requirements for fault detection in digital data processors used in safety-related systems. One of these calls for testing the random access memory of an operating computer on a periodic basis, e.g., every 15 seconds. This typically involves writing a known value to each addressable memory location and reading the locations to verify the stored values. Applications data contained in the memory is temporarily stored, e.g., in processor registers, while each memory location is being tested.

Though testing techniques as described above can give system designers and operators added comfort in the reliability of their control systems, the utility of those techniques is limited.

Though otherwise unrelated to the foregoing, the art also suggests the use of redundancy as a means of enhancing reliability. This typically involves using two or more control elements in place of one. For example, U.S. Pat. No. 4,347,563 discloses an industrial control system in which redundant digital data processing units serve as bus masters "of the moment," monitoring status information generated by primary processing units. If a redundant unit detects that a primary has gone faulty while executing an application program, the redundant unit loads that program and takes over the primary's function.

A problem with systems that rely on redundant processing units is updating newly inserted units. Typically, this is accomplished by taking both active and new units off-line so that the contents of the former can be downloaded to the latter. Though the off-line period can be relatively brief by layman's standards, it can be quite long from a control perspective, thus, raising the probability that a failure will disrupt system operation, or worse.

An object of the present invention is to provide improved methods and apparatus for control and, more particularly, by way of example, for duplicating data utilized by modules in a control system. Another object is to provide improved such methods and apparatus as can be utilized in fault-tolerant or fault-detecting systems, e.g., for purposes of copying data from an active module to a newly inserted backup module.

Yet still another object of the invention is to provide such methods and apparatus as permit a backup unit to be updated while the control system remains online.

Still yet another object of the invention is to provide such methods and apparatus as can be implemented with little additional software and hardware overhead.

SUMMARY OF THE INVENTION

The foregoing are among the objects attained by the invention which provides, in one aspect, a control system with a first module that includes a memory and diagnostic logic. The diagnostic logic periodically tests at least selected locations in the memory and, in connection with such testing, reads data from those locations and writes the data back to them. A second module is coupled to the first module such that the data that is written back to the memory of the first module is transferred to the second module, as well.

Further aspects of the invention provide a system as described above in which the first and/or second modules each form part of a workstation, field controller, field device, smart field device, or other functionality arranged for industrial, manufacturing, service, environmental, or process control. Data transferred between the modules can comprise any of bits, bytes, words, longwords, records, arrays, matrices, structs, objects, data structures or other items from or portions of the first module's memory. The system can include logic that maps addresses, symbolic names or other identifiers associated with data in the first module to corresponding addresses, symbolic names or other identifiers for association with the data in the second module.

By way of example, the first module can be a "smart" field device in a process control system. The second module can be a workstation that (among other things) stores backup copies of configuration or other data in the field device. Diagnostic logic present in the field device, for example, can test locations in its memory, e.g., in compliance with the aforementioned IEC and DIN standards. In connection with the testing, the logic can read and rewrite the contents of the memory locations. Switching logic can transfer those rewritten contents (e.g., data words, records, objects, etc.) to the second module, as well as to the first module's memory. Mapping or other conversion logic can map or translate addresses or other identifiers in connection with the transfer.

Further aspects of the invention provide a system as described above in which the first and second modules include first and second memories, respectively; the first memory element normally being coupled to a first memory bus; the second memory element normally being coupled to a second memory bus. Each memory element stores data in accord with commands received over the bus to which it is coupled. The switching logic has a memory update mode that temporarily couples the second memory element to the first memory bus in lieu of the second memory bus, e.g., so that the second memory element receives data and data storage commands identically with those received by the first memory element. The switching logic can remain in the memory update mode long enough for the diagnostic logic to rewrite all of the selected locations of the first memory element.

Further aspects of the invention provide a control device as described above in which the switching element includes a field effect transistor (FET) switch and, preferably, an array of such switches. The switches connect conductors in the first and second memory buses to respective conductors of the first memory element.

The invention provides, in other aspects, a control device having first and second memory elements and first and second memory buses, as described above. A first switching element has a first switching mode that couples the first memory element to the first memory bus, and a second switching mode that couples the first memory element to the second memory bus. A second switching element likewise has a first switching mode that couples the second memory element to the second memory bus, and a second switching mode that couples the second memory element to the first memory bus.

Logic coupled to the first and second switching elements normally places them in their respective first modes. The logic can respond, e.g., to insertion or powering-up of one of those elements, for placing the associated switching element in its second mode, thereby, causing its memory to be updated from the other memory.

Still further aspects of the invention provide a control device as described above in which the first and second memory elements are part of first and second modules, respectively, that include processors and input/output logic, as well as memory elements.

Still other aspects of the invention provide methods of operating control devices and systems of the types described above.

Methods and apparatus according to the invention are advantageous over the prior art. For example, a memory (or a selected portion thereof) can be copied to a backup unit without either unit being brought off-line. Moreover, the memory (or memory portion) can be copied quickly, i.e., in no more time than is required to verify the integrity of the unit being backed up. Still further, apart from switch setting, no substantial foreground, background or other additional processes are required for the update process.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
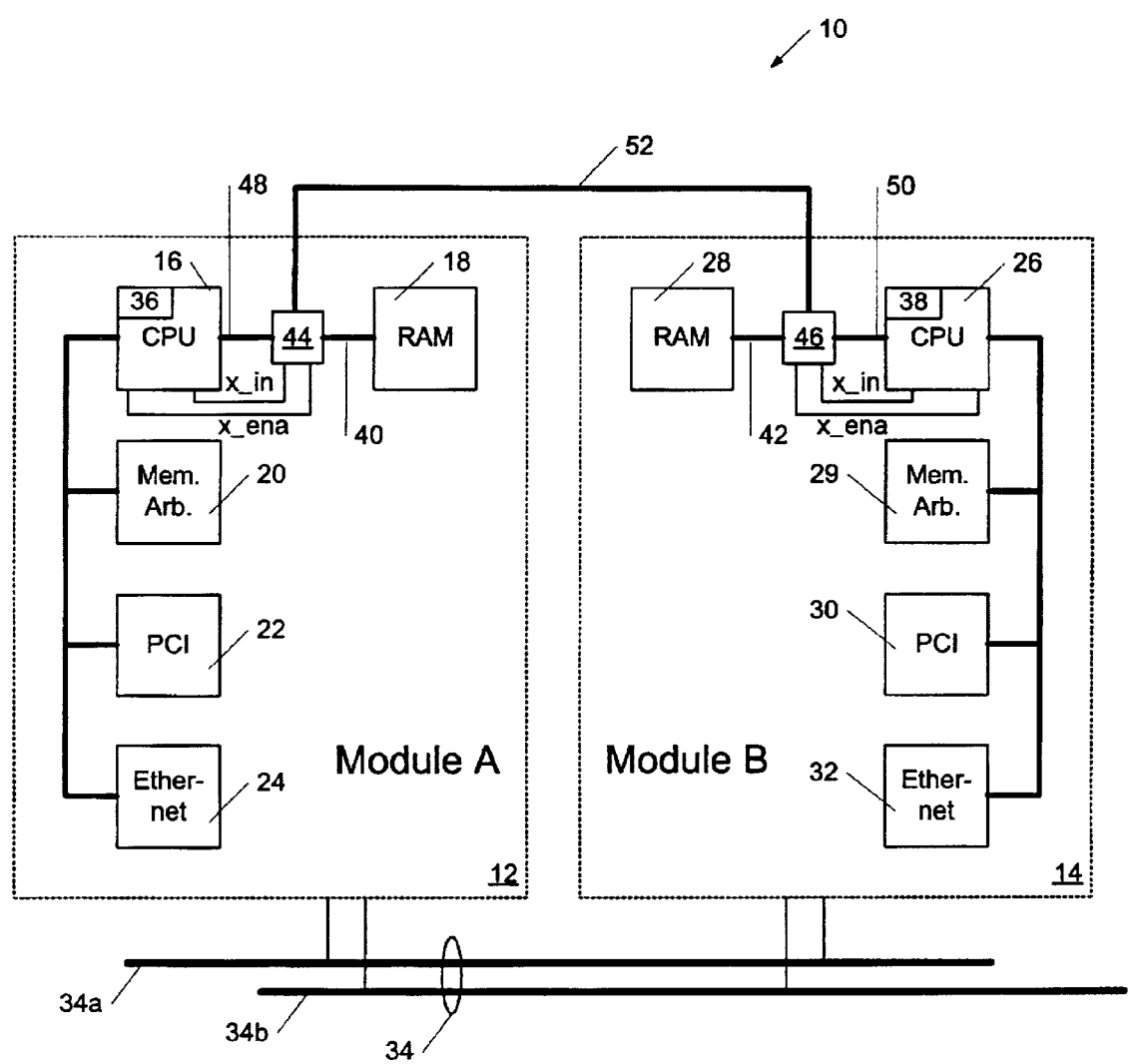
FIG. 1 depicts a control device according to the invention.

FIG. 1 depicts processing modules 12, 14 of a control device or system 10 according to the invention. Such modules may be separate workstations, field controllers, field devices ("smart" or otherwise), or other functionality within an industrial, manufacturing, service, environmental or other control system.

In the illustrated embodiment, modules 12, 14 represent processing sections within an individual such workstation, field controller, field device, or other such functionality for industrial, manufacturing, service, environmental or other control. Particularly, illustrated sections 12, 14 provide fault-detecting and, preferably, fault-tolerant operation: upon failure of one of the processing sections, the other processing section may continue operation without substantial interruption.

Illustrated section 12 includes processor 16, memory 18, memory arbitration circuitry 20, PCI (or other bus) interface circuitry 22 and ethernet (or other network) interface circuitry 24. These are selected, configured and operated in the conventional manner known in the art, as modified in accord with the teachings hereof. Illustrated section 14 includes like components 26–32, likewise selected, configured and operated in the conventional manner, as modified in accord with the teachings hereof.

Sections 12, 14 can operate in lock-step synchronism, such that the contents of their respective memories 18, 28 and the operations of their respective processors 16, 26 (and other components) are substantially identical and synchronous at all times of normal operation. In the illustrated embodiment, sections 12, 14 operate with loose coupling, such that, although the processors 16, 26 (and other components) operate asynchronously with respect to one another, the operations they perform and the contents of their respective memories 18, 28 are identical when viewed over a longer time interval (e.g., between input/output or other events).

Those skilled in the art will appreciate that modules 12, 14 may operate with other degrees of synchronism and/or coupling. Thus, by way of non-limiting example, one of the modules may serve as a "shadow" to the other: in the event that the master becomes disabled, the shadow can take over. Moreover, the modules may operate in entirely different manners and with entirely different purposes, except insofar as one of the modules duplicates the memory (or a portion thereof) of the other module. Module 12, for example, may be a field device and module 14 may be a workstation that duplicates or "backs up" bits, bytes, words, longwords, records, arrays, matrices, structs, objects, data structures or items in or portions of the memory of section 12.

In the illustrated embodiment, logic (not shown) can be provided that monitors the operations of the sections 12, 14 to insure the desired degree of synchronicity or coupling. Further logic (not shown) can be provided to permit only one of the processing sections, to wit, the "master," to drive signals to other components (not shown) of the control system. In this regard, illustrated sections 12, 14 are coupled to such other components by line 34, which may comprise a bus, network, or other communications medium which may, itself, be fault-tolerant, e.g., as indicated by redundant conductor sets 34a, 34b.

One and preferably both of modules 12, 14 comprise diagnostic logic that verifies the integrity of the respective memories 18, 28. This is accomplished by writing a known bit pattern or value to each location and reading the value so stored to insure a match. Compliance with the aforementioned IEC and DIN standards requires that each location within memories 18, 28 be checked once, approximately every 15 seconds. The specific testing pattern, timing, etc., varies in accord with standard.

To avoid losing valid data during testing, the diagnostic logic records the contents of each memory location, e.g., to a register of the associated processor, prior to testing that location. The recorded value is rewritten to the respective location, preferably, immediately after it has been tested.

Diagnostic testing of the memories can be performed by separate logic within (or outside) each of the modules 12, 14. In the illustrated embodiment, it is exercised by the respective processors 16, 26. This is indicated by blocks 36, 38 in FIG. 1.

Memories 18, 28 respond in the conventional manner to applied signals to store and retrieve data. Thus, for example, memory 18 responds to control signals applied via bus 40 to store data applied via that same bus. Memory 28 likewise, and by way of further example, responds to control signals applied via bus 42 to store data applied via that same bus.

In normal operation, buses 40, 42 are coupled to processors 16, 26, respectively, and more generally to the other components of the respective modules 12, 14. To this end, the illustrated embodiment employs switches 44, 46, each having a first operational mode that couples the buses 40, 42 (and, therefore, the memories 18, 28) to the processors 16, 26, respectively, and more generally to buses 48, 50, respectively, internal to each module. In this latter regard, it will be appreciated that the components 16 and 20–24 of module 12 may share a common bus (e.g., bus 48) and, likewise, that components, 26 and 29–32 share a common bus (e.g., bus 50).

With its switch 44 in its first mode, the memory 18 responds to control signals applied via bus 48 to store and retrieve data as dictated by elements 16 and/or 20–24. Similarly, with switch 46 in its first mode, memory 28 responds to control signals applied via bus 50 to store and retrieve data as dictated by elements 26 and/or 29–32.

Switches 44, 46 each have a second operational mode that couple buses 40, 42 (and, therefore, memories 18, 28) to processors 26, 16, respectively, and more generally to buses 50, 48, respectively, of the other module. In this mode, the memory 28 responds to control signals applied via bus 50 to at least store data dictated by elements 26 and 29–32. Similarly, memory 18 responds to control signals applied via bus 48 to store data dictated by elements 16 and 20–34. In the illustrated embodiment, read data generated by a memory 18, 28 is ignored when the respective switch is in the second mode.

A line 52 connects switches 44, 46 to one another, thereby, enabling the transfer of control and data signals between the modules 12, 14. Those skilled in the art will appreciate that each switch 44, 46 can be connected directly to the bus 50, 48, respectively, of the other module 14, 12, respectively, rather than to the other switch 46, 44, respectively. In the illustrated embodiment, line 52 comprises a dedicated parallel bus having equal width to the memory buses 48, 50.

In other embodiments, it can comprise a bus of differing width from either of memory buses 48, 50 or it can comprise other communications medium, e.g., a serial bus, network, or otherwise. Indeed, line 52 and line 34 can be coextensive, i.e., insofar as they represent the same communications medium. In such other embodiments, switches 44, 46 are equipped with suitable interface circuitry to permit the transfer of information with line 52. Such interface circuitry can include mapping logic for converting addresses in one address space (e.g., the memory address space of module 12) to that of another address space (e.g., the memory address space of module 14). Alternatively, such interface circuitry can include logic providing symbolic name or other identifier conversion, e.g., in embodiments where the modules 12, 14 use line 52 to transfer information pertaining to selected memory objects, data structures or other items.

During normal operation of the illustrated embodiment, switches 44, 46 operate in their first respective modes. A switch 44, 46 is placed in its second operational mode when its respective memory 18, 28 requires updating from the memory 28, 18 of the other module. The second operational mode is typically used, for example, upon powering-up a module and/or following an error. In the illustrated embodiment, that mode is preferably used only temporarily, i.e., for a period long enough for the diagnostic logic of the other module to sweep through its respective memory. In alternate embodiments, either of the switches can be configured to The mode of switches 44, 46 is determined by control signals X_IN applied by the processors 16, 26, or other logic within (or outside) modules 12, 14. In the illustrated embodiment, a processor, e.g., 26, applies an X_IN signal (and more precisely takes the X_IN signal high) to its respective switch 46 in order to place that switch in the second mode. The other processor, e.g., 16, must concurrently apply an X_ENA signal (and, more precisely, take the X_ENA signal high) to its respective switch 44 in order to permit data to be transferred from its internal bus, e.g., bus 48, to the inter-switch line 52.

Those skilled in the art will appreciate that, in other embodiments the X_IN and X_ENA signals may be used individually or in combination with other signals and signal sources. Likewise, a single switch may be employed for all transfers. Thus, for example, switch 44 can be configured to transfer to module 14, over line 52, all signaling on memory buses 48, 50, respectively, pertaining to selected portions of memory (e.g., duplicated memory regions) including duplicated bits, bytes, words, longwords, records, arrays, matrices, structs, objects, data structures or other items or regions.

Switches 44, 46 comprise any hardware or software logic capable of providing coupling between the memory buses of the respective modules. In the illustrated embodiment, it provides for fast, low-power, low-noise switching over a parallel bus, directly connecting each of the conductors in the memories 18, 28 to the conductors in each of the memory buses 48, 50 to which they may be coupled. Such a switch can comprise field effect transistors (FETs) and, particularly, arrays of such switches, though other semiconductor and nonsemiconductor devices may be used instead or in addition. In alternate embodiments, the switches comprise interface logic (and, optionally, mapping logic) for transferring shared data and corresponding addresses, symbolic names, or other identifiers to/from line 52.

Figure 2:
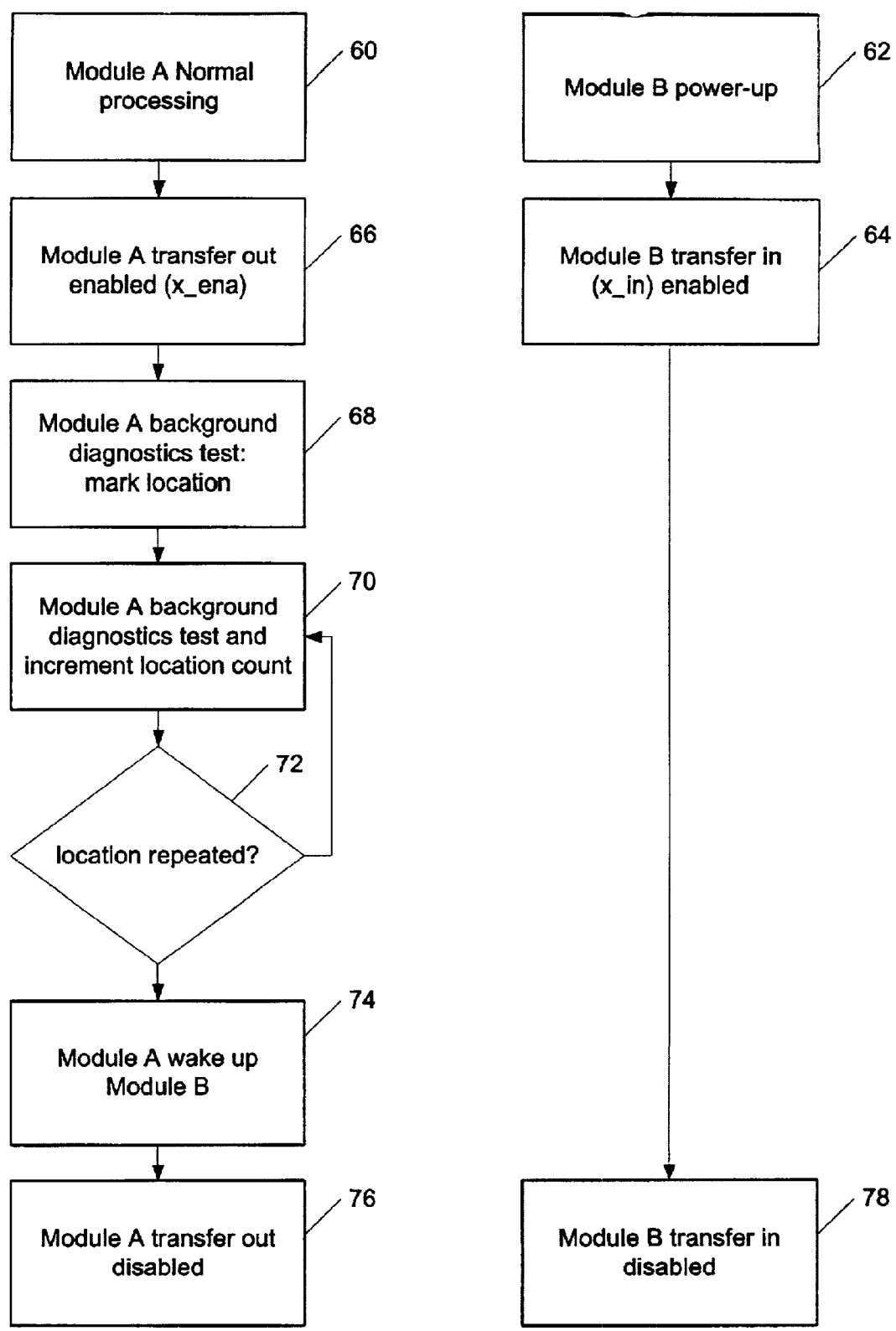
FIG. 2 depicts a method of operating dual processing sections of the control device of FIG. 1.
Figure 3A:
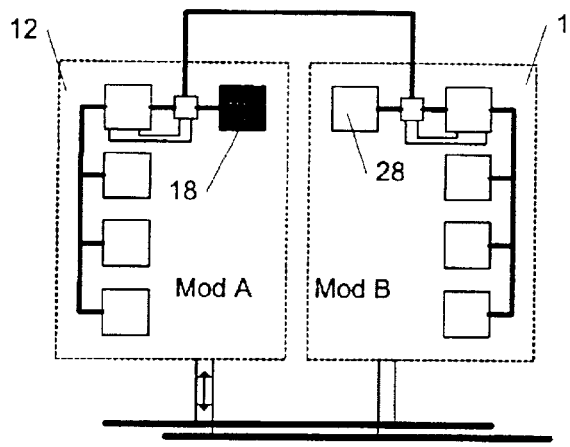
FIG. 3 depicts operation of the processing sections of the device of FIG. 1 during execution of the method of FIG. 2.
Figure 3B:
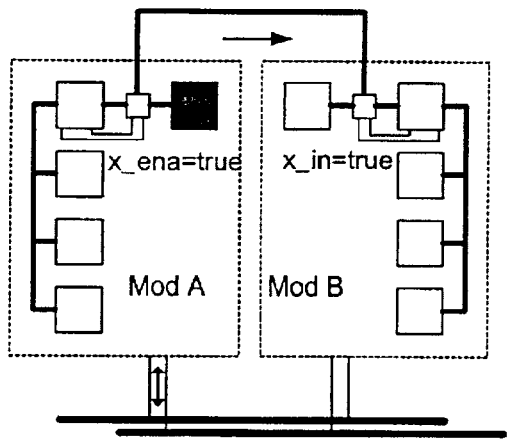
Figure 3C:
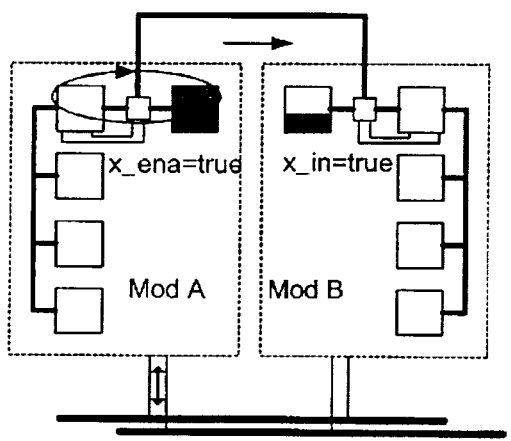
Figure 3D:
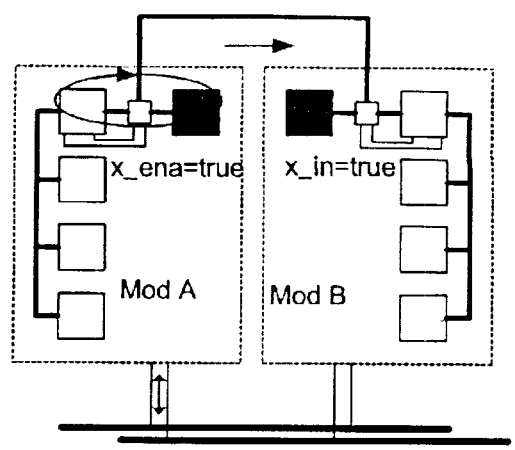
Figure 3E:
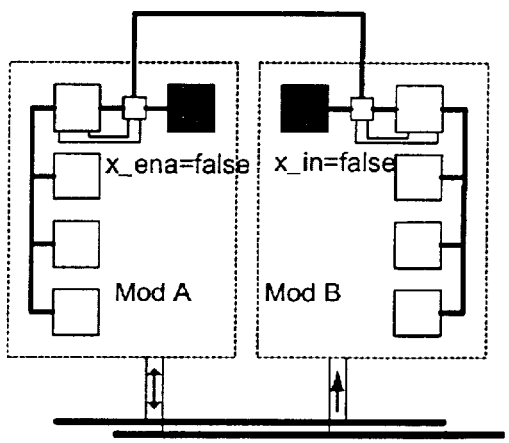
Figure 3F:
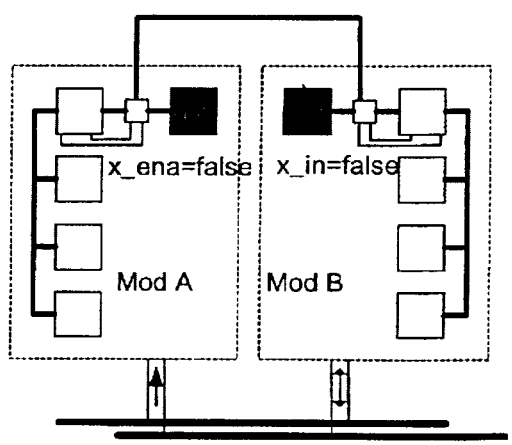

FIG. 2 depicts a method of operating the modules 12, 14 to effect updating of the memory 28 of the latter from memory 18 of the former. FIG. 3 illustrates operation of the modules as a consequence of execution of such a method.

In step 60, processing section 12 (e.g., Module A) engages in normal processing, i.e., with its switch 44 in its first operational mode. In step 62, processing section 14 (e.g., Module B) powers up or otherwise enters a state in which its memory 28 requires updating. See also, FIG. 3A, wherein memory 18 is shaded, indicating that it contains valid data. Conversely, memory 28 is unshaded, indicating that it contains invalid data. The double arrow between module 12 and line 34 also indicates that module transfers data with other components of the system (not shown) in the normal manner. No such arrow is shown between module 14 and bus 34.

In step 64, processor 26 of module 14 asserts X_IN, placing switch 46 in its second mode and, thereby, coupling memory 28 and bus 42 to bus 48. This has the effect of decoupling memory 28 and bus 42 from bus 50. In order to permit a transfer over line 52, process 16 asserts X_ENA. See step 66. See also FIG. 3B, wherein the arrow adjacent line 52 indicates the direction of information transfer of that bus during the update process.

Processors 16, 26 maintain assertion of X_ENA and X_IN, respectively, for a period sufficiently long to enable the diagnostic element 26 of module 12 to test all locations of memory 18. This entails, inter alia, reading and rewriting the contents of each of those locations. As a consequence of switch 46 being in its second mode, the rewritten data is stored to corresponding locations in memory 28, as well as to their locations in memory 18. See FIGS. 3C–3D, wherein memory 28 is shown as partially, then fully, shaded, depicting its filling with valid data from memory 18. The circular path shown in FIG. 3C between processor 16 and memory 18 depicts the memory testing cycle exercised by element 26.

A sequence for testing all locations of memory 18 is shown in steps 68–72. This includes marking a current location in memory 18, reading the data contained at that location and temporarily storing it (e.g., in a register or another memory location), testing the location (e.g., by writing a known bit pattern to the location and verifying that it is properly stored), writing the temporarily stored value back to the location, incrementing the location count and testing the next location. This process is repeated until the initial current location is subject to retesting.

At this time, module 12 wakes module 14. See step 74. In the illustrated embodiment, this is accomplished by having module 12 can call a routine, which causes its stack to be pushed and its register contents to be written to memories 18 and 28. In step 76, module 12 deasserts X_ENA, thereby, disabling further transfers over line 52. Module 14 likewise deasserts X_IN. See step 78. Module 12 then signals an interrupt, causing both modules 12, 14 to execute identical interrupt handling routines, which pop the stacks of the respective processors 16, 26 and place them in identical contexts, i.e., using data and status information written to the respective memories 18, 28 during the aforementioned push. The processors 16, 26 thereafter resume normal operation in identical states. See FIGS. 3D–3E, wherein arrows between module 14 and line 34 indicate that the module is in slave mode (FIG. 3D), at least listening to that bus and, subsequently, master mode (FIG. 3E), where it drives data to the bus.

Those skilled in the art will, of course, appreciate that other sequences for testing memory can be used. Likewise, module 14 need not rely on a wakeup from module 12 to begin normal operation and can instead rely, by way of non-limiting example, on a self-timed wait period. Moreover, the modules 12, 14 need not achieve identical state prior to resumption of operation by module 14.

Described above are methods and apparatus meeting the desired objects. Those skilled in the art will appreciate that the illustrated embodiment is merely an example of the invention and that other embodiments making modifications thereto may fall within the scope of the invention, of which

We claim:

1. A control system comprising
   a first module and a second module, each forming at least part of any of a workstation, field controller, field device, smart field device, or other functionality for any of industrial, manufacturing, service, environmental, or process control,
   the first module comprising a first memory element that is normally coupled to a first bus and that stores data in accord with commands received over that bus,
   the second module comprising a second memory element that is normally coupled to a second bus and that stores data in accord with commands received over that bus,
   diagnostic logic, coupled to at least the first bus, that issues commands causing data in at least selected storage locations in the first memory element to be periodically re-written to those storage locations via the first bus,
   switching logic coupled to the first and second modules, the switching logic transmitting to the second module at least selected data on the first bus,
   wherein the witching logic has a memory update mode that selectively couples the second memory element to the first bus and decouples the second memory element from the second bus during a period in which the diagnostic logic is causing data in the selected storage locations in the first memory element to be re-written to those storage locations.

2. A control system according to claim 1, wherein the switching logic comprises any of a bus, network and other communications medium.

3. A control system according to claim 1, comprising logic that converts any of an address, symbolic name or other identifier associated with data transferred between the modules.

4. A control system according to claim 1, wherein the switching logic transfers any of bits, bytes, words, longwords, records, arrays, matrices, structs, objects, data structures or other items or portions of memory between the first module and the second module.

5. A control device, comprising:
   a first memory element that is normally coupled to a first bus and that stores data in accord with commands received over that bus,
   a second memory element that is normally coupled to a second bus and that stores data in accord with commands received over that bus,
   a switching element that is coupled to the first and second memory elements and to the first and second buses, the switching element having a mode that temporarily couples the first memory element to the second bus, while decoupling the first memory element from the first bus, and
   logic coupled to at least the second bus that issues commands causing data in at least selected storage locations in the second memory element to be re-written to those storage locations.

6. The control device of claim 5, wherein said logic issues commands causing data in at least selected storage locations in the second memory element to be periodically re-written to those storage locations.

7. The control device of any of claims 5 and 6, wherein the switching element couples the first memory element to the second bus for a period sufficient to ensure that substantially all of the selected storage locations in the second memory element are re-written.

8. The control device of claim 7, wherein the switching element comprises an FET switch.

9. The control device of claim 7, wherein the switching element comprises an FET switch array.

10. The control dice of claim 9, wherein each element of the FET switch array selectively couples conductors in the second bus to respective conductors of the first memory element.

11. A control device, comprising:
   a first memory element that is normally coupled to a first bus and that stores data in accord with commands received over that bus, a second memory element that is normally coupled to a second bus and that stores data in accord with commands received over that bus, first memory test logic coupled to at least the second bus, the first memory test logic issuing commands causing data in at least selected storage locations in the second memory element to be periodically rewritten to those storage locations, a first switching element having a memory update mode that selectively couples the first memory element to the second bus and decouples the first memory element from the first bus, during a period in which the first memory test logic is causing data in the selected storage locations in the second memory element to be re-written to those storage locations.

12. A control device according to claim 11, comprising second memory test logic coupled to at least the first bus, the second memory test logic issuing commands causing data in at least selected storage locations in the first memory element to be periodically re-written to those storage locations, a second switching element having a memory update mode that selectively couples the second memory element to the first bus and decouples the second memory element from the second bus, during a period in which the second memory test logic is causing data in the selected storage locations in the first memory element to be re-written to those storage locations.

13. A control device according to claim 12, wherein the first and second switching elements are not concurrently in their respective memory update modes.

14. The control device of claim 11, wherein at least one of the switching elements comprises an FET switch.

15. The control device of claim 11, wherein at least one of the switching elements comprises an FET switch array.

16. The control device of claim 15, wherein each element of the FET switch array couples conductors in the first and second buses to respective conductors of a respective one of the memory elements.

17. A control device, comprising:
a first module and a second module operating with at least loose coupling,
the first module comprising
a first processor that is coupled to a first bus,
a first memory element that stores data in accord with commands received over a bus to which it is coupled,
the first processor having a memory test mode wherein it issues issuing commands causing data in at least selected storage locations in the first memory element to be periodically re-written to those storage locations,
the second module comprising
a second processor that is coupled to a second memory element by a second bus,
a second memory element that stores data in accord with commands received over a bus to which it is coupled,
a switching element that is coupled to the first and second buses and the second memory element, the switching element having a conventional operation mode that couples the second bus to the second memory element, and that has a memory update mode that couples the first bus to the second memory element,
logic that changes the first switching element from the conventional operation mode to the memory update during a period in which the first processor is in the memory test mode.

18. A control device, comprising:
a first module and a second module operating with at least loose coupling,
the first module comprising
a first processor that is coupled to a first bus,
a first memory element that stores data in accord with commands received over a bus to which it is coupled,
the second module comprising
a second processor that is coupled to a second bus,
a second memory element that stores data in accord with commands received over a bus to which it is coupled,
the first and second processor each having a memory test mode wherein they issue commands causing data in at least selected storage locations in the respective memory element to be periodically re-written to those storage locations,
a first switching element that is coupled to the first and second buses and the second memory element, the switching element having a conventional operation mode that couples the second bus to the second memory element, and that has a memory update mode that couples the first bus to the second memory element,
a second switching element that is coupled to the second and first buses and the first memory element, the switching element having a conventional operation mode that couples the first bus to the first memory element, and that has a memory update mode that couples the second bus to the first memory element,
logic that changes a selected one of the first and second switching elements from the conventional operation mode to the memory update during a period in which the second and first processors, respectively, is in the memory test mode.

19. The control device of any of claims 17 and 18, wherein at least one of the switching elements comprises an FET switch array.

20. The control device of claim 19, wherein each element of the FET switch array couples conductors in the first and second buses to respective conductors of a respective one of the memory elements.

21. A method of operating a control device, comprising the steps of:
storing data in a first memory element in accord with commands received over a first bus,
storing data in a second memory element in accord with commands received over a second bus,
temporarily coupling both the first memory element and the second memory element to the second bus so that both memory elements store data in accord with commands received over the second bus,
issuing commands on the second bus that cause data in at least selected storage locations in the second memory element to be re-written to those storage locations.

22. The method of claim 21, wherein the step of issuing commands comprises issuing commands on at least the second bus that cause data in at least selected storage locations in the second memory element to be periodically re-written to those storage locations.

23. The method of any of claims 21 and 22, comprising the step of coupling both the first and second memory elements to the second bus for a period sufficient to ensure that substantially all of the selected storage locations in the second memory element are re-written.

24. The method of claim 23, comprising the step of coupling the first memory element to the second bus with an FET switch.

25. The method of claim 23, comprising the step of coupling the first memory element to the second bus with an FET switch array.

26. The method of claim 25, comprising the step of coupling conductors in the second buses to respective conductors of the first memory element wit respective elements of the FET switch array.

27. A method of operating a control device, comprising the steps of:

storing data in a first memory element in accord with commands that are normally received over a first bus, storing data in a second memory element in accord with commands that are normally received over a second bus, issuing commands on the second bus causing data in at least selected storage locations in the second memory element to be periodically re-written to those storage locations, selectively coupling both the first memory element and the second memory element to the second bus and concurrently decoupling the first memory element from the first bus during a period in which the commands are issued on the second bus causing data to be re-written.

28. A method of operating a control device according to claim 27, comprising the steps of issuing commands on the first bus causing data in at least selected storage locations in the first memory element to be periodically re-written to those storage locations, in lieu of selectively coupling both the first memory element and the second memory element to the second bus, selectively coupling both the first memory element and the second memory element to the first bus and concurrently decoupling the second memory element from the second bus during a period in which the commands are issued on the first bus causing data to be re-written.

29. The method of claim 28, wherein each element of the FET switch array couples conductors in the first and second buses to respective conductors of a respective one of the memory elements.

* * * * *

UNITED STATES PATENT AND TRADEMARK OFFICE
CERTIFICATE OF CORRECTION

PATENT NO.   : 6,779,128 B1
DATED        : August 17, 2004
INVENTOR(S)  : Alan A. Gale, Christian Bourdin and Gene A. Cummings It is certified that error appears in the above-identified patent and that said Letters Patent is hereby corrected as shown below:

Column 8,
Line 12, following "wherein the", please delete "witching" and insert -- switching --

Column 9,
Line 7, following "to be periodically", please delete "rewritten" and insert
-- re-written --

Column 11,
Line 9, following "memory element", please delete "wit", and insert -- with --

Signed and Sealed this

Eighth Day of March, 2005

JON W. DUDAS
*Director of the United States Patent and Trademark Office*